(12) United States Patent
Guillory et al.

(10) Patent No.: US 11,724,452 B2
(45) Date of Patent: Aug. 15, 2023

(54) LIQUID COOLING FOR PELLET EXTRUDER IN A FUSED DEPOSITION MODELING SYSTEM

(71) Applicant: 3D Systems, Inc., Rock Hill, SC (US)

(72) Inventors: Clay M. Guillory, Colorado Springs, CO (US); Nicholas Booth, Springdale, AR (US)

(73) Assignee: 3D SYSTEMS, INC., Rock Hill, SC (US)

( * ) Notice: Subject to any disclaimer, the term of this patent is extended or adjusted under 35 U.S.C. 154(b) by 0 days.

(21) Appl. No.: 17/847,164

(22) Filed: Jun. 22, 2022

(65) Prior Publication Data

US 2022/0324169 A1  Oct. 13, 2022

Related U.S. Application Data

(62) Division of application No. 16/384,669, filed on Apr. 15, 2019, now Pat. No. 11,407,171.

(60) Provisional application No. 62/658,572, filed on Apr. 16, 2018.

(51) Int. Cl.
*B29C 64/209* (2017.01)
*B33Y 30/00* (2015.01)

(52) U.S. Cl.
CPC ............ *B29C 64/209* (2017.08); *B33Y 30/00* (2014.12)

(58) Field of Classification Search
CPC ..... B29C 64/209; B29C 64/25; B29C 64/255; B29C 64/329; B29C 64/364; B33Y 30/00
See application file for complete search history.

(56) References Cited

U.S. PATENT DOCUMENTS

2009/0314391 A1* 12/2009 Crump ................. B33Y 10/00 164/94
2017/0291364 A1* 10/2017 Womer ................. B29C 64/106

* cited by examiner

Primary Examiner — Joseph S Del Sole
Assistant Examiner — John Robitaille

(57) ABSTRACT

In the context of a system that uses a pellet-type extruder head to form solid objects by moving the extruder relative to a build surface while melting and extruding pellets of raw material, systems and methods are provided which comprise cooling at least a portion of a pathway by which pellets of raw material are conveyed to a rotating extruder lead screw of the extruder head.

7 Claims, 6 Drawing Sheets

LIQUID COOLING FOR PELLET EXTRUDER IN A FUSED DEPOSITION MODELING SYSTEM

RELATED APPLICATIONS

The present application claims the benefit of priority under 35 U.S.C. 119(e) to a provisional application filed on Apr. 16, 2018 and having application Ser. No. 62/658,572, which is incorporated by reference herein. The present application further claims the benefit of priority under 35 U.S.C. 120 to application Ser. No. 16/384,659 which was filed on Apr. 15, 2019 and is hereby incorporated by reference herein.

FIELD OF THE INVENTION

This invention relates to achieving reliable operation of a thermoplastic extruder as a component of a rapid prototyping system, such as a fused deposition modeling system. More particularly, this invention relates to using a direct pellet extruder for depositing of build materials and to the application of liquid cooling to remove heat at specific portions of a passage by which pelletized materials are fed to a heated extruder mechanism therein.

BACKGROUND

In the field of three-dimensional printing (3D printing), solid objects may be formed by additive processes such as the cumulative fusing of powdered materials or polymerization of liquid monomers onto previously polymerized strata. Printed objects are generally constructed layer-by-layer by causing solidification to occur in a particular pattern as each layer is formed.

Fused deposition modeling (FDM) is an additive process for building solid objects that involves melting a solid material such as a thermoplastic forcing the melt through a nozzle and depositing the molten material along a particular path onto the surface of a gradually enlarging workpiece formed from previous melt deposition which has already cooled and re-hardened. As plastic flows out of the nozzle, the motion of the nozzle relative to a substrate or so-called 'build plate' is mechanically implemented using a motion control system comprising computer-controlled motors. By depositing extruded material, initially to a bare surface of the build plate and then to a workpiece that is progressively formed thereon, a finished object having specific dimensions and contours may be formed. Common materials used for FDM include ABS (acrylonitrile-butadiene-styrene), PLA (polytactic acid), terephthalate esters and nylon although an increasingly wide array of plastics are being successfully 'printed' as the technology matures.

Pellet extruders offer certain advantages in industrial settings—particularly for cost-effective, large-formal printing. Performing FDM using common materials such as ABS also benefits greatly by operating within a treated enclosure. However, the combination of a direct pellet extruder and a heated enclosure introduces a new problem with reliable feeding of pelletized materials to the hot extruder.

What is needed to achieve better operation of a pellet-fed extruder in an FDM system is more reliable feeding of loose pellets by improved temperature control prior to a point at which pellets reach desired melting stages in the extruder.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION OF EXEMPLARY EMBODIMENTS

Figure 1:
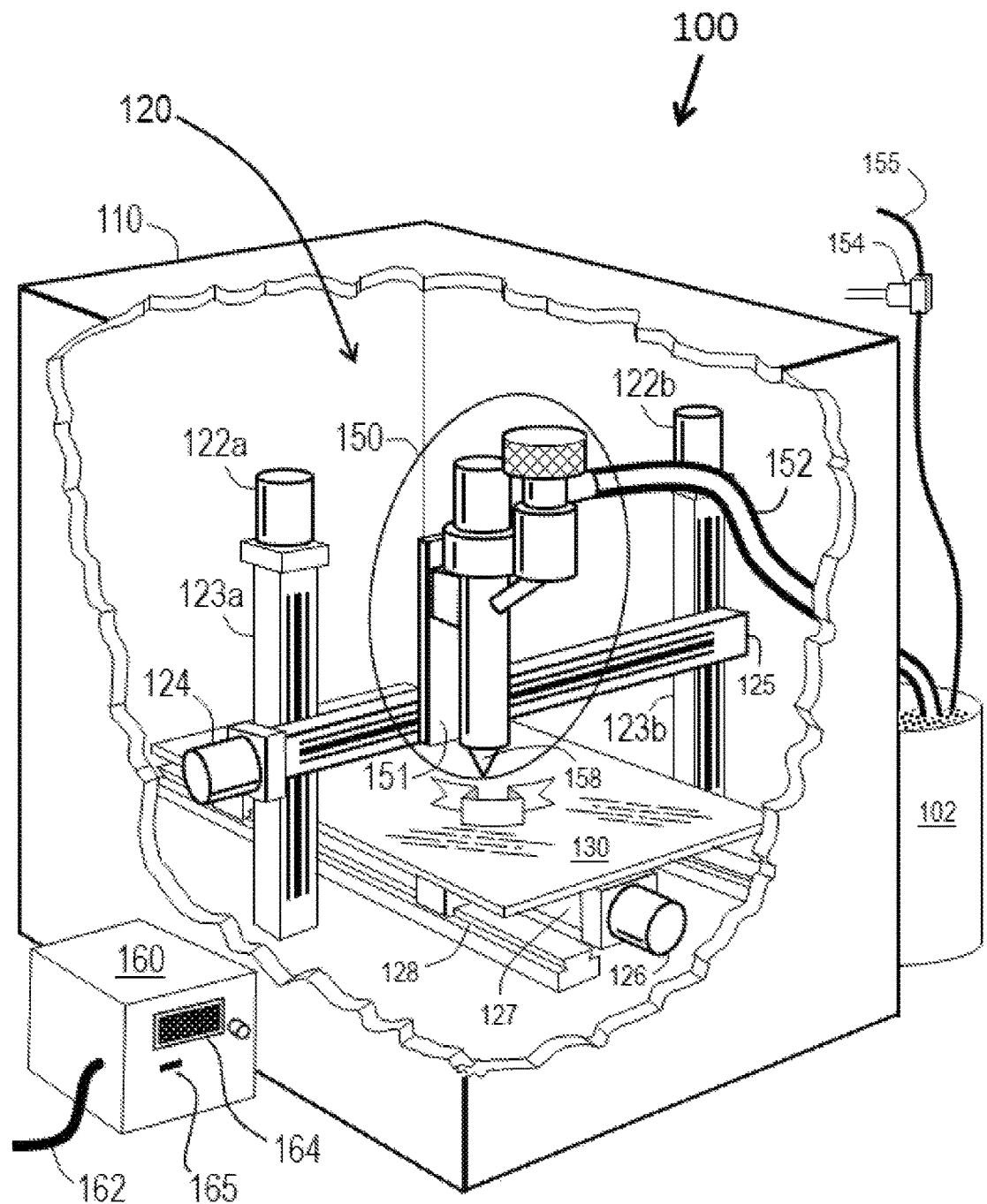
FIG. 1 is an overall pictorial of a fused deposition modeling system that employs a pellet-type extruder head housed enclosed within an enclosure.

In the following description, for the purposes of explanation, numerous specific details are set forth in order to provide a thorough understanding of illustrative and preferred embodiments of the invention. It is apparent however that some embodiments may be practiced without these specific details or with alternative, equivalent arrangements. In some instances, more common structures and devices are excluded from view or shown in block diagram form in order to avoid unnecessarily obscuring components that are more essential for illustrating embodiments of the invention and its operating principles.

As used herein, the term 'molten' is loosely applied to any state of a material when it is heated or otherwise softened and is of sufficiently low viscosity to flow through a small nozzle under pressure. It is recognized that for some materials a more precise terminology, such as a 'plastic' or 'amorphous' state, may be more commonly used and the term 'molten' is intended to encompass these situations. When a material is said to be 'molten' herein it will generally be at a temperature substantially above its 'glass transition' temperature, where applicable.

Recently applied to serve as moving 3D printing heads, direct pellet extruders offer many advantages over the types of extruders that accept fixed-diameter solid filament from a spool. As a principal advantage in industrial printing a pellet extruder can handle long, uninterrupted builds that would otherwise consume multiple conventional-size spools when using a filament extruder. For example, using a pellet extruder, a large 3D printed object with a mass of 100 Kg can be formed over a period of hours or days of continuous printing. In contrast, a filament-type extruder building the same object would require numerous interruptions for changing spools, which are commonly supplied in 1 Kg, 10 Kg or 25 Kg sizes. At each point during the build when an empty spool of material must be replaced, there is a risk of affecting the quality of the object and, in some cases, the interruption may even jeopardize an entire print process in which hours of print time and considerable expense have already been invested.

Another factor in favor of extruding directly from pellets is reduced cost. Plastics in palletized form are considerably less costly than plastics that have already been formed into precise-diameter filament. Furthermore, because of the direct conversion from bulk pellets to molten form, a pellet extruder can print materials that are not amenable to being intermediately formed, stored and manipulated as solid filament, such as polypropylene, glass-filled polycarbonate polyethylene and PVC. A direct pellet extruder can also support high throughput and large diameter discharge, such as through a 6 mm nozzle. This is considerably larger than the largest practical filament sizes of around 3 mm which often discharge through a nozzle opening of 1 mm or less. Thus, a direct pellet extruder can print large objects hundreds of times faster than a practical filament supplied print head.

Aside from pellet extrusion, another important advance in FDM involves heating the build plate upon which objects are initiated and to which they remained attached throughout the build process.

With many FDM build materials, heating of the build plate is essential to a successful build. Many popular materials used in FDM, notably ABS, exhibit a high coefficient of thermal expansion. With such materials, considerable shrinkage occurs as the extruded material cools. This can cause a 3D printed part, built by adding layers of hot material upon still-cooling previous layers, to warp significantly. This warpage is often so severe that parts of an object being formed separate from the build plate and curl upward. Warping can also cause splitting or separate of layers in the middle of an object being built. That is, warp forces accumulated over several layers can exceed layer-layer cohesive forces. One way to reduce warping is to lessen the dramatic temperature change (and therefore rate of change) that the solidifying material undergoes. This is done by heating the build plate and by raising the temperature of the whole build environment surrounding the object being built.

Heating the build plate itself also improves the adhesion of the initial layer of deposited material to the build plate. In this manner the strong attachment of the material to the build surface, coupled with stiffness of the build plate surface, assists with keeping the initial build layers from peeling away from the build plate during the build. Once several layers have been deposited and cooled while being forced to stay flat, the lower layers of the object become a rigid flat base that can resist warping forces of subsequent layers added on top. The heating of the overall environment is another measure taken to reduce the dramatic temperature change and resulting stresses as successive layers are added further and further way from the heated build surface. This practice is appropriate for large format, industrial-size printers. Especially for objects having long dimensions and being formed from high shrinkage materials (such as ABS), it is useful to heat the build surface to a specific temperature and perform the entire building process within a heated enclosure.

From the foregoing, it is apparent that using pellet extruders in conjunction with heated enclosures advantageously expands the capabilities of FDM systems. However, this combination also introduces a new problem in which the feed mechanism—by which loose pellets are transported to a hot extruder—itself reaches elevated temperatures and pellets begin sticking to one another, causing blockages and interruption of flow to the extruder. The present teachings relate to reducing temperatures at certain points to prevent premature adhesion of pellets as they travel through an extruder head. The following detailed description covers the general operation of a pellet-extruding FDM system, explains the factors contributing to premature pellet adhesion and describes how this problem is to be mitigated in accordance with the present teachings.

FIG. 1 depicts an enclosed fused deposition modeling (FDM) system 100. System 100 is shown to comprise a motor driven multi axis motion control system 120 which controllably moves extruder head 150 relative to build plate 130. The motion control componentry combined with extruder head 150 constitute a fused deposition modeling system, that is, a form of 3D printer. Multi-axis motion control system 120 as shown creates movement along three orthogonal axes in an arrangement known as a Cartesian coordinate system wherein any point within the build space is referenced by a unique triplet of scalar values corresponding to displacement along three mutually orthogonal axes.

Extruder head 150 is shown to be attached to a carriage 151 that is controllably moved along the long axis of transverse beam 125 by the rotation of the shaft of an X-axis motor 124. Typically, beam 125 will comprise one or more linear bearings facilitating the smooth movement of carriage 151 parallel to the long axis of beam 125. Furthermore, beam 125 may house a lead screw (not distinctly visible in the diagram) which is coupled to carriage 151 by a precision nut, fixed within the beam 125 by rotary and thrust bearings and coupled to the shaft of X-axis motor 124. The rotation of the shaft of X-axis motor 124 may rotate the lead screw which, in turn, will cause carriage 151 to move closer to or further away from motor 124 in a controlled manner. X-axis motor 124 is often a stepping motor but may also be an AC or DC servo motor with a shaft position encoder and/or tachometer operating in a closed-loop control mode to facilitate moving to very precise positions. Many such arrangements of motors, lead screws, bearings and associated components are possible.

Whereas the arrangement of motor 124 and beam 125 accomplish controlled movement of the extruder head 150 in what may be termed the horizontal X-axis in the print-space coordinate system, motors 122A, 122B and their respective columns 123B, 123A may use a similar arrangement of linear guides, bearings and lead screws such that Z-axis motors 122A, 122B controllably move extruder head 150 in a vertical direction, that is, closer to or further away from build plate 130. More specifically, beam 125 may be attached to carriages (hidden) that couple to lead screws within columns 123A and 123B. As Z-axis motors 122A and 122B rotate their respective lead screws in synchrony, the entirety of beam 125, X-axis motor 124 and extruder head 150 are caused to move upward or downward.

To accomplish yet another motion of build plate 130 relative to extrusion head 150, a third motor, which may be referred to as Y-axis motor 126 may act upon a lead screw 127 to which the build plate 130 is coupled. The rotation of the shaft of motor 126 controls the position of build plate 130. Build plate 130 may be supported by, and may slide or roll along, linear bearing rails such as rail 128.

It should be understood that the arrangement of motors, bearings and such depicted in FIG. 1 is merely one example of achieving controlled relative motion between extruder head 150 and build plate 130 such that an object is formed by the extrusion of materials through nozzle 158. Various other arrangements are common and equally suitable as an embodiment in which the present invention may be applied. For example, in some arrangements, the build plate may move in two horizontal axes while the extruder head may move only vertically. Alternatively, the build plate may only move vertically while an extruder head moves in two horizontal axes. In yet other arrangements, an extruder head may be coupled to a motor driven gantry that accomplishes motion in all three axes. While the build plate remain stationary. The present invention is equally applicable to a wide variety of arrangements motion control arrangements independently including those just mentioned, as well as so-called 'Core XY', 'H-bot' and 'delta' arrangements.

In addition, it should be understood that, for simplicity, FIG. 1 excludes many fasteners, brackets, cables, cable guides, sensors and myriad other components that may be employed in the manufacture of such systems but which are not essential for explaining the principles of the present invention nor for describing the best mode thereof. Where linear guides and lead screws have been described, it should be understood that the present invention is not limited to being applied to machines that use such mechanisms and that, for example, belt driven systems and gear driven systems are equally suitable for use and susceptible to the challenges that the present addresses.

Extrusion head 150 is described in further detail below. In summary, the role of extrusion head 150 is to receive plastic in pellet form driven by bursts of air through a feed tube 152 and to melt the plastic and drive it out of the end of nozzle 158 in a continuous stream. Typically, plastic pellets are stored in a large external pellet reservoir 102 and provided to the extruder head 150 in small increments as needed. A detector (to be shown and described below) included with the extruder head 150 determines when additional pellets are needed and electrically controls the actuation of an air valve 154 which switches on a momentary burst of compressed air as provided by compressed air inlet 155.

To accomplish the formation of a solid object in three dimensions upon the build plate 130 from extruded materials emanating from the tip of nozzle 158, a control box 160 is provided with electronics, such as a microprocessor and motor drive circuitry, which is coupled to the X, Y and Z motors as has been described above, as well as to numerous sensors and heating elements, in the system 120, some of which will be described further below in connection with FIG. 2. Electronics within control box 160 also control an extruder motor, to be described below. Some examples of suitable control electronics which may operate within control box 160 are the RAMBo™ control board manufactured by UltiMachine running Marlin firmware and so-called 'Smoothie boards' executing open-source Smoothieware firmware.

A wide variety of 3D printer control boards may be used. The primary role of such controller boards is to interpret sequential lists of positional commands, such as so-called G-code files and to output signals that drive the motors to implement the commanded movements. A G-code file, or the like, describing the coordinate movements necessary to form a particular object may be supplied to the controller through connection of the controller to a wired data communications network via, for example, TCP/IP communications through an Ethernet connection or via a wireless network connection, such as 'WiFi' or IEEE 802.11 connection. A G-code file (or a data file, such as a file in STL format from which a G-code file may be prepared) may also be supplied on a removable flash memory card, such as an SD card, which may be inserted at SD card slot 165 on control box 160.

For providing a human-accessible control interface, essentially all of the available control boards support an LCD display and user interface 164, as is shown to be a part of control box 160 in FIG. 1. The electrical power to drive the control box 160 and the motors sensors and heating elements of system 120 comes from a connection to electrical power lines 162.

Build plate 130 is preferably healed to a controlled temperature, most commonly using electrical resistance heating elements (not visible in the diagram) which may be mounted under the bed and thermally coupled thereto. For this purpose, it is common to use a heating mat made of high-temperature-rated silicone rubber that has electrically conductive paths embedded within and is adhered to the bottom of the build plate. A temperature sensor, such as a thermistor is typically included to provide feedback to a proportional-integral-derivative (PID) controller which maintains a set build plate temperature by controlling the application of heating current to the heating mat. Such elements for heating the build plate are commonplace and need not be further described here.

The temperature within enclosure 110 may be elevated over typical room ambient temperature by the addition of yet other heating elements (not shown) or simply by the heat incidentally dissipated from build plate 130. With a suitably insulated enclosure 110, heat from build plate 130 may be fully sufficient to heat the interior of the enclosure to beneficial levels by convection alone.

Figure 2:
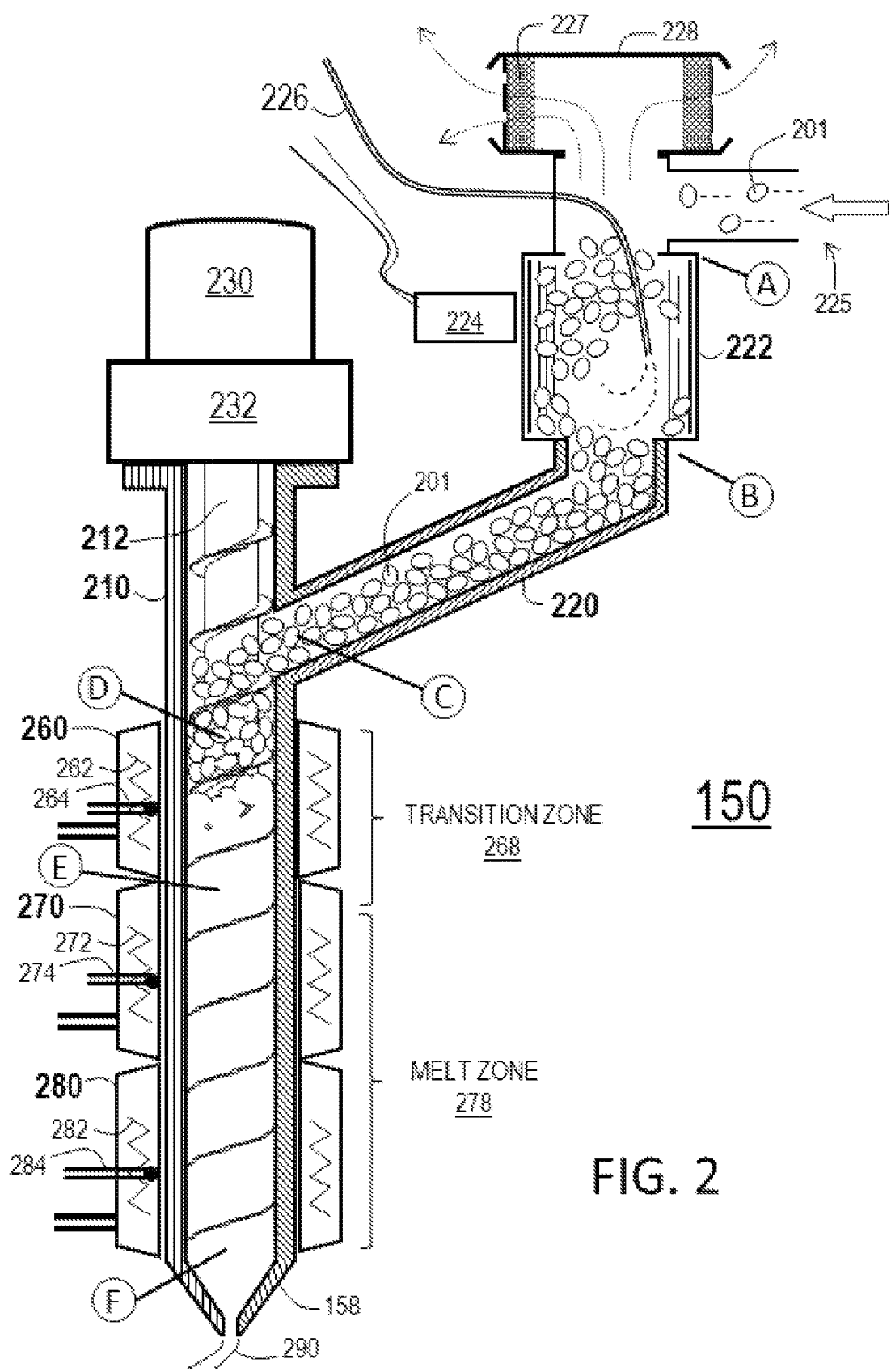
FIG. 2 is a pictorial of a pellet-type extruder head.

For explaining the general operating principles of pellet-type extruder head 150, FIG. 2 of the drawings depicts a typical design of a pellet extruder. Extruder head 150 establishes a context in which the present teachings may be applied but, as it is shown in FIG. 2, does not yet incorporate said teachings. FIG. 2 presents a desired or expected operation of such an extruder head, but it must be emphasized that, without the benefit of the present teachings, successful functioning is hindered by undesirable effects as will be described in subsequent drawings. As introduced above, the role of pellet-type extruder head 150 is to convert solid pellets of plastic into a controlled stream of molten plastic and to deposit the plastic at specific locations to form an object on build plate. (The letter designations appearing in FIG. 2 will be referenced later in connection with FIG. 6.)

In FIG. 2, extruder head 150 comprises lead screw 212 disposed within cylindrical barrel 210. Rotation of lead screw 212 by the action of a motor 230 through reduction gearbox 232 to achieve high torque at low controlled speeds, causes a general downward movement of plastic pellets 201 entering the barrel from pellet hopper 220. Barrel 210 is heated by a plurality of heating stages 260, 270 and 280 which are controlled to achieve a desired temperature profile along the length of the barrel. For example, as pelletized materials entering at the top of the barrel and are compressed and compelled down by the lead screw, it is desirable for an upper zone referred to as a 'transition zone' 268 to be set at 160 Celsius. Further down barrel 210, the materials may experience a temperature nearing ultimate melt temperature at 220 Celsius as they pass through a melt zone 278. These temperatures work well for ABS but may differ for other materials. Heating stages to accomplish this temperature profile may comprise electrically resistive heating elements that nestle against or encircle barrel 210 to conduct heat thereto. The uppermost heating stage 260 comprises a heating element 262 such as a resistive wire (nichrome) by which passing a controlled average current achieves a desired temperature of the barrel. A common heating tape or heating jacket is one example of a heater that may be applied.

Heating stage 260 also comprises a temperature sensing element 264, such as a thermocouple that provides actual temperature information to a control unit that gate the flow of electrical current to the healing element 262 to maintain a constant desired temperature. This temperature control function may be integrated into or collocated with other control electronic circuitry within control box 160. Many of the commonly available motor control boards have integrated temperature controller capabilities but this may also be handled by separate, commonly available closed loop controllers.

Heating stages 270 and 280 operate similarly to stage 260, each having respective heating elements 272, 282 and temperature sensors 274, 284 to achieve independent localized temperature control along extruder barrel 210. It is common for each heating element 262, 272, 282 to have an output rating in the hundreds of watts.

The effects of the heat thus applied to barrel 210, along with the compaction and propulsion of material through the barrel by lead screw 212, are apparent in that loose pellets 201, which are depicted as loosely arranged and which tend to settle downward under gravity within pellet hopper 220, are contacted and driven downward by lead screw 212. As the pellets are driven downward and enter transition zone 268, the pellets begin to soften and flow into one another and any interstitial air starts to be driven out due to the rising pressure. As the softened materials move into the more elevated temperature of melt zone 268, the melted plastic becomes homogeneous and tree of any voids or air bubbles. In moving downward through the barrel, the materials reach full temperature and are driven down into nozzle 158 and they can be elected as a continuous bead in the form of an extruded output 290. Even though a continuous outflow can be maintained indefinitely as long as pellets are supplied, it should be noted that, in more typical builds, the expulsion of extruded material can also be abruptly halted and resumed by the control of extruder motor 230, which is within the realm of what is motion-controlled subject to the same G-code scripting just as the X-Y-Z motors. In other words, the extruder can produce continuous streams or short segments of discharged material as needed for a given build process. Control of extruder motor 230 in coordination with the motion effected by the motors 122, 124, 126, results in controlled amounts of material being deposited in specific locations and patterns to construct a three-dimensional solid object on build plate 130.

Lead screw 212, and particularly the spiral flute thereof, acts as one form of a moving hard surfaced driving element which forcefully propels the pellets down the barrel by direct mechanical contact. In alternative designs for pellet transport within a pellet extruder, other forms of moving hard surfaces that could be applied such as plungers, augers, conveyors, reciprocating claws and the like. Any and all of these alternatives may be said to engage pellets and forcefully advance the pellets along a pathway through the extruder in a direction leading away from the inlet and towards the nozzle. In contrast, some other portions of a pellet transport pathway within an extruder may rely solely upon gravity or air movement for propulsion, rather than mechanical contact with a moving hard surface.

Pellets 201 are provided to extruder head 150 from a remote location at pellet inlet 225. As mentioned previously, a long pellet feed tube 152 may deliver air-borne pellets using blasts of compressed air. As a burst of air carries pellets into the extruder head 150 the pellets fall into a holding chamber 222 and the air that carried the pellets disperses upward through an air filter 228 which comprises a fine screen or filter medium 227, such as a fluted paper filter. Air filter 228 traps any pellets that are propelled upward by an incoming air blast and allows them to settle into chamber 222 when the blast subsides. Air filter 228, especially filter medium 227, also captures extraneous debris or powder that might arrive with a burst of pellets.

As pellets within feed hopper 220 are consumed by the extrusion process, being pulled into extruder barrel 210 by lead screw 212, pellets in holding chamber 222 drop into feed hopper 220 and the overall level of pellets in chamber 222 slowly diminishes. A pellet level sensor, such as a capacitive proximity sensor 224, detects the presence or absence of pellets above a given level in the holding chamber 222. One such suitable capacitance sensor is the model CR30-15DN supplied by Autonics USA. When sensor 224 senses that the fill level of pellets within chamber 222 is below a threshold, it sends an electrical signal indicating that more pellets are needed and this signal (either directly or through a control circuit in control box 160) causes electrically-actuated air valve 145 (FIG. 1) to turn on for a time. This causes compressed air to enter the mouth of the feed tube 152 which is immersed in a reservoir of pellets. Pellets are entrained with the resulting air burst and carry pellets to the chamber 222 until sensor 224 determines that chamber 222 is again adequately filled. The frequency with which sensor 224 calls for a burst, of pellets depends on the rate at which pellets are being consumed by the extruder. That, in turn, depends on printing speed and nozzle size. The automatic refilling mechanism just described seeks to ensure adequate pellet supply to the extruder over a wide range of consumption rates. To further ensure reliable feeding of pellets from holding chamber 222 into pellet hopper 220, a stream of compressed airs supplied through tube 226 to provide constant agitation of pellets inside holding chamber 222. This prevents the pellets from settling into a 'bridge' formation—that is to say, coming to rest such that multiple pellets crowd the opening of the hopper and mutually prevent one another from either dropping into the tube or moving out of the way. This agitation also seeks to prevent pellets from remaining in contact long enough to form adhesions, although the effectiveness drops rapidly with increased chamber temperature. To allow a human operator to visually monitor successful pellet feeding and replenishing, holding chamber 222 is preferably made of a transparent material.

Figure 3:
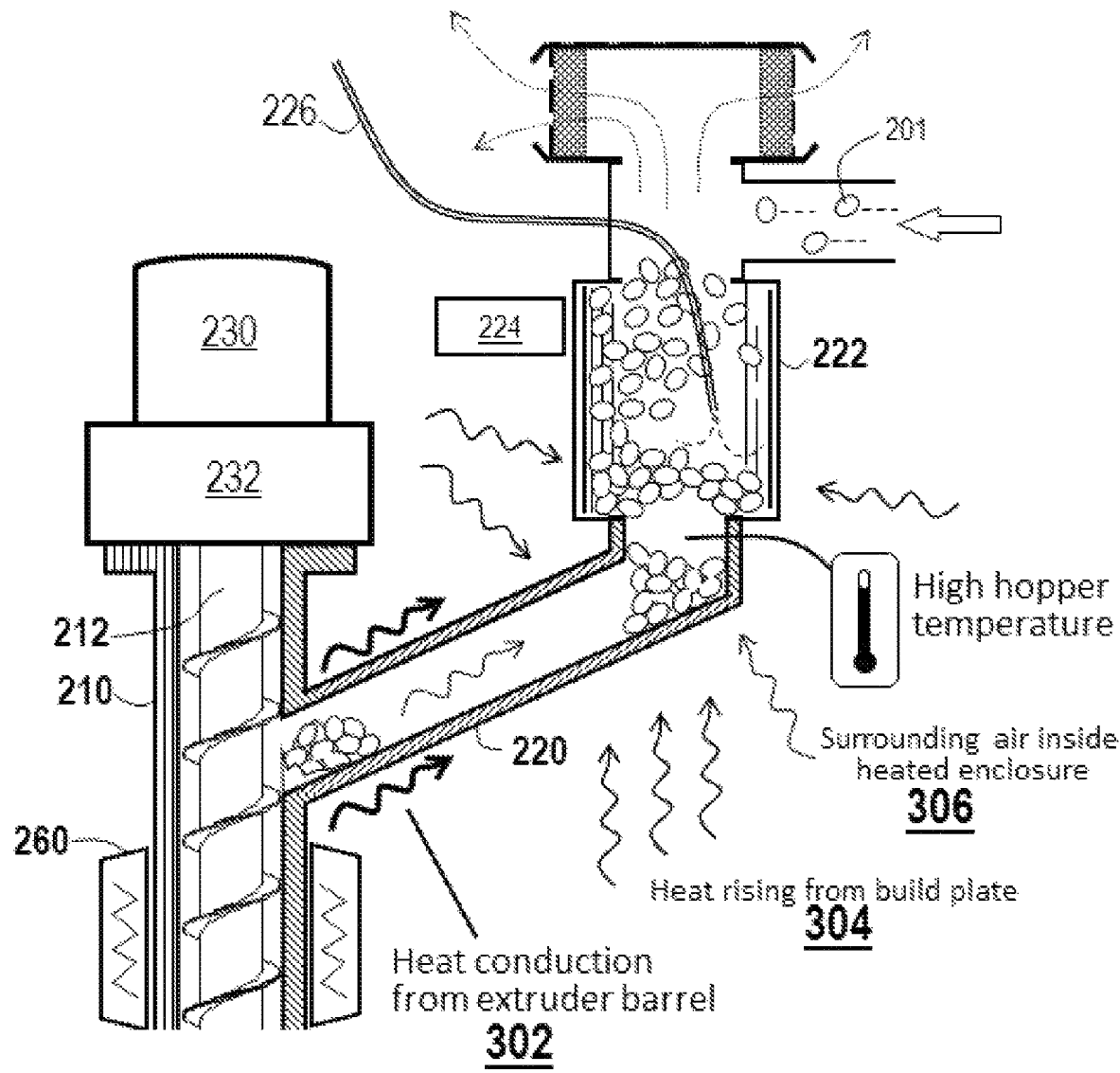
FIG. 3 describes the sources of heat affecting temperatures within a pellet-type extruder head.

FIG. 3 is a pictorial of the upper portion of extruder head 150, specifically highlighting some problem areas that hinder reliable pellet flow.

Pellets 201 can form blockades, notably in and around the feed hopper 220 that impede the flow of pellets to the extruder barrel 210 and can cause the extruder to 'run empty'. This can be disastrous in the midst of a 3D printing run, particular if a sizable amount of time and material has gone into a print job. Large print jobs are often performed unattended, so an interruption extruder output may not be discovered for quite some time. The extruder may stop emitting material altogether at some point during the build process. In some cases after this has happened, the print may be resumed at a given print layer though this rarely gives seamless results. Even worse, a extruder may cease discharging material as it goes through the motions in X-Y-Z for several layers and then spontaneously resume its output after the nozzle has moved significantly above the last solid layer of the workpiece. Subsequent output of molten material from the nozzle will not have a surface to bond to but instead will be ejected into open air above the workpiece and fall randomly over the build surface, generally draping the workpiece in a nest of extraneous strands of material.

It is generally true that pellets 201 have a melting point that is not attained, per se, until reaching a point further down barrel 210, such as between transition zone 268 and melt zone 278. However given the purity of the pellet surfaces and the degrees of softening and deformation that can occur over a broad range of temperatures before 'melting' actually occurs, it is possible for pellets become somewhat tacky and adhere to one another well below the rated melting point for the pellet material. Any pellets that enter the extruder barrel 210 are forcefully driven by the lead screw 210 and softened by the elevated temperatures therein. Pellets that have not fully entered barrel 210 are fed by gravity and are presumed to rattle about freely as they would at room temperature. Having two or pellets adhere to one another before fully entering the extruder barrel can be disastrous because jamming and backup of pellets can occur, preventing any other pellets from reaching extruder barrel 210.

Undesirable elevation of temperatures within feed hopper 220 and holding chamber 222 may be caused by heat coming off of extruder barrel 210 and its associated heating stages 260, 270, 280. This heat transfer from the very hot stages of the extruder is primarily conducted through the solid walls of the barrel in direct physical contact with the walls of the hopper. (See label 302 as to direct heat conduction through the barrel and hopper walls.) Radiation and convection may also contribute to heat transfer to hopper 220 especially given that hopper 220 is directly above the very hot heating stages of the extruder and bathed in convection currents from theses heaters while in an enclosure 100.

Another source of heat that can raise temperatures of hopper 220 and chamber 222 is build plate 130, which is essentially always directly underneath the extruder and puts out substantial heat over a large area, often at 75-100 Celsius. (See label 304 noting the heat rising from the build plate as a contributor to elevated hopper temperature.)

A third significant source of heat that drives up hopper temperatures is the air inside the heated enclosure 100. (See label 306 as to the heated enclosure contributing to higher hopper and chamber temperatures.) The need for operating the FDM process in an elevated temperature environment has been explained above but this aspect creates a new, and heretofore unrecognized, problem specifically in the context of performing pellet extrusion FDM in a heated environment. Whereas filament-fed machines are not sensitive to the problem of gravity-fed pellets prematurely adhering or melting machines and whereas less-capable machines (both filament and pellet machines) may operate in room temperature air for limited materials and build sizes, the present teachings enable a more capable FDM system, which handles exceptionally large build volumes and versatile material selection, to operate in the requisite heated enclosure by addressing the newly realized problem of maintaining reliable pellet feeding under these new thermal conditions.

Figure 4:
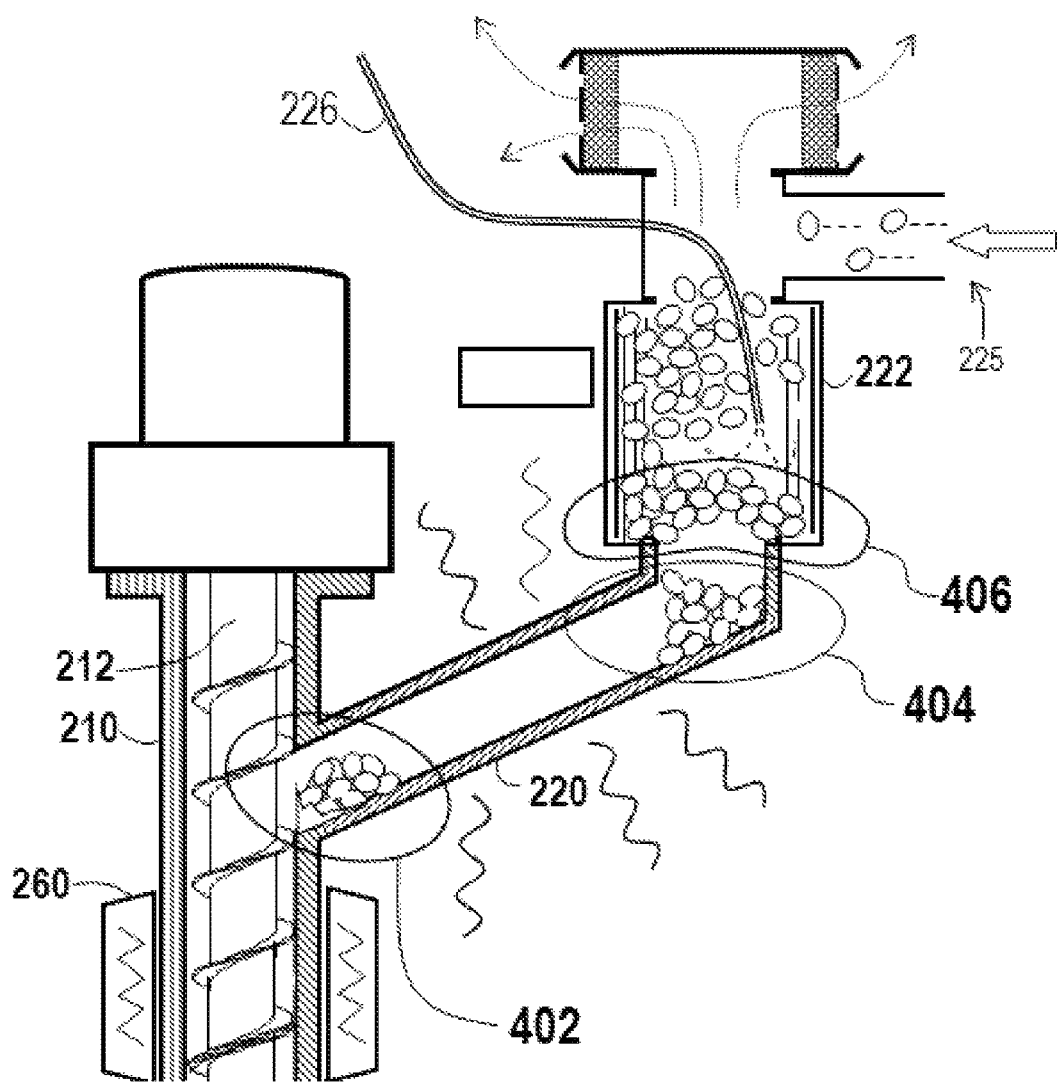
FIG. 4 describes the nature and location of adverse blockages resulting from elevated temperature within a pellet-type extruder head.

FIG. 4 is similar to FIG. 3 but removes many of the labels of heat sources in favor of highlighting where actual faults in pellet feeding have occurred due to the elevated temperatures. One problematic location occurs at region 402—a transition from the pellet hopper to the extruder barrel. At this point, the apparatus is being heated at least by heating stage 260 and possible by stages 270 and 280. The walls of the extruder barrel and even the extruder lead screw 210 may contribute heat by conduction. Consequently, pellets arriving at region 402 may prematurely soften and stick to one another—even briefly—in such a way that causes a jam. (For simplicity, the resulting backup of pellets further up hopper 222 is not explicitly shown in this diagram.) In the worst cases the pellets that become stationary at region 402 may even start to flow together. Unfortunately the temperatures here, while elevated, will typically not soften or liquefy these pellets sufficiently for them to flow under gravity only and to drop into the extruder barrel.

If the same extruder processing the same pelletized material at the same extruder temperatures were operating in open air at room temperature, the surrounding air might keep the temperature at region 402 sufficiently cool that the pellets would not tend to adhere to one another or to the walls of hopper 220. As mentioned above, however some larger builds (for example, occupying a 500 cm cube or even a 1 m cube) with many materials (such as ABS) can only be achieved within a heated enclosure. Preventing pellets from prematurely adhering to one another in a pellet extruder, even in heated surroundings, is key to enabling greater capabilities in FDM.

In FIG. 4, a second region 404 of hopper 222 is another point of concern where elevated temperatures may cause faults in pellet travel. Even though region 404 is further away from the highest temperature heat sources that region 402 is subject to, region 404 involves turning a corner. Here, even very slight adhesion among pellets here favors the formation of a jamming structure. Pellets may come to rest against the bottom of the corner of hopper 220 and start to mutually support one another against the gravitational forces that would cause them to travel further down the hopper.

Yet another potential problem area is evident as region 406, wherein pellets in the chamber 222 have formed a 'bridge' spanning the opening from the chamber 222 to hopper 220. Agitating air flow from tube 226 seeks to prevent pellets from settling into such an arrangement, which can happen even at room temperature. As pellets initially fill the hopper and most of the chamber immediately after a burst of pellets at inlet 225, chamber 222 may become so full of pellets that agitation airflow cannot keep pellets in motion. A mound of pellets at the entrance of hopper 222 may be buried under a chamber-full of other pellets. As the mound recedes into the hopper, this can leave a dome or bridge of pallets that had previously been supported by the mound. In just the right orientation these remaining pellets may bear upon one another so that none can proceed down the opening nor can they spontaneously move aside and disrupt the bridge. Again, this phenomenon is largely avoided by constant agitation as shown but the problem rapidly reemerges with the slightest tendency for adhesion or enhanced friction among pellets. Air agitation may optionally extend into hopper 220 as an additional measure to prevent clustering as pellets fall into, hopper 220 from chamber 222 and make the turn towards extruder barrel 210.

In practice, many pellets supplied in bulk are cylindrical or pillow shaped, but are drawn here as ovals for simplicity. A wide variety of pellet shapes are contemplated to exhibit comparable feeding challenges and to benefit from applying the present teachings.

Figure 5:
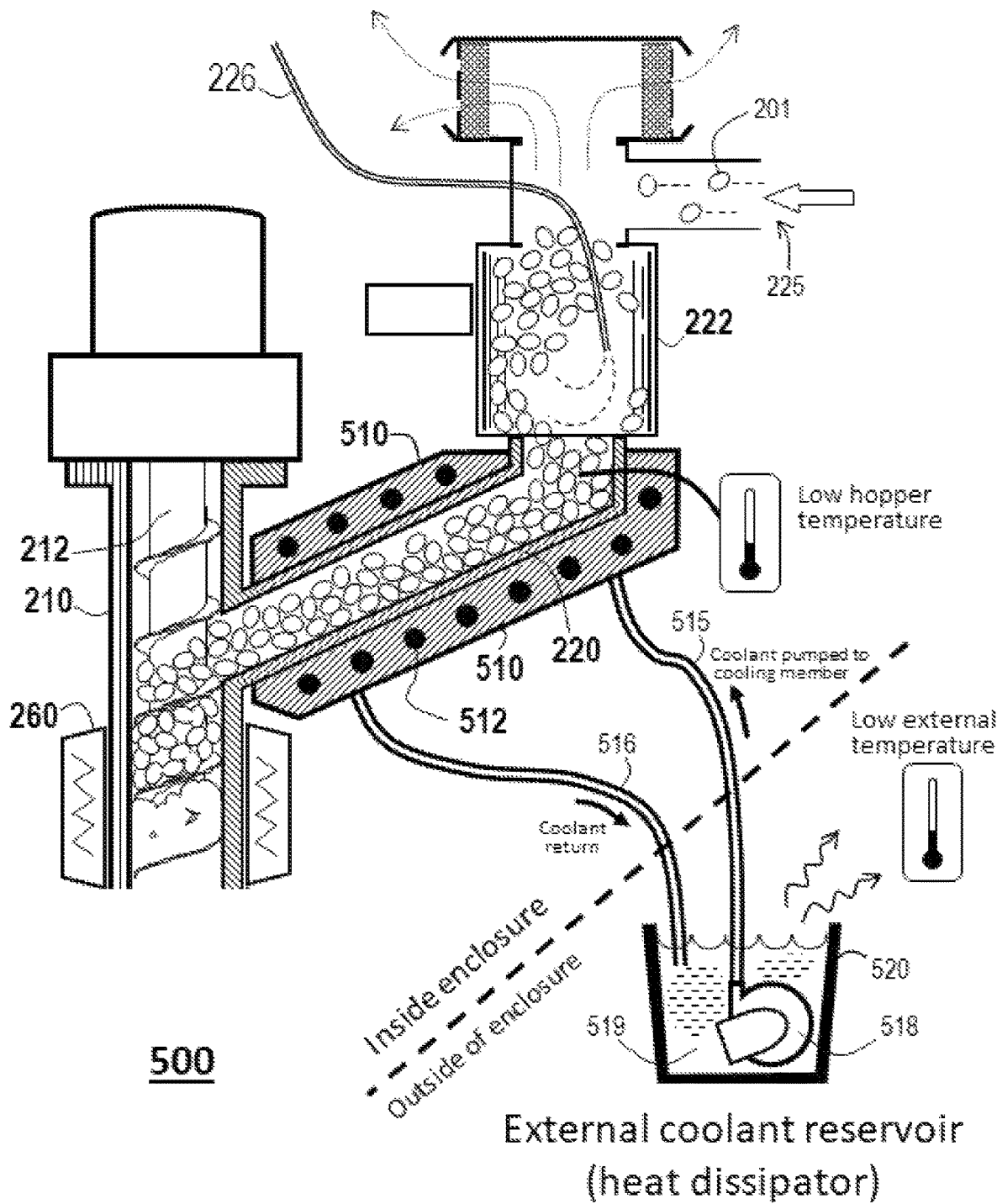
FIG. 5 depicts a pellet-type extruder head comprising a cooling member in accordance with a preferred embodiment of the present invention.

FIG. 5 depicts a modified pellet-type extruder head 500 in accordance with the present teachings. A cooling member 510 is thermally coupled to remove heat from at least the pellet hopper 220 portion of the extruder head 500. This heat removal counteracts the temperature rise as would be otherwise caused by conduction of heat from the extruder barrel 210 and from other sources 304, 306 shown earlier. Consequently, pellets within hopper 222 and lower portion of chamber 220 are kept at comparatively low temperatures such that pellets do not tend to adhere to one another or otherwise coalesce. Cooling member 510 is shown to comprise a series of connected channels or passages 512 through which a liquid coolant, such as water, may pass. A reservoir 520 of coolant liquid 519 is shown to be disposed outside of heated enclosure 110 and is preferably in thermal contact with room temperature air, an external body of water or some other thermal mass outside of enclosure 110 such that heat can be dissipated. A radiator or other form of heat exchanger may optionally be used as an efficient way to pass heat from the liquid coolant 519 into the surroundings outside the heated enclosure 110. May variations for externally dissipating heat borne by the liquid coolant are possible and contemplated as being amenable to present teachings. The coolant is preferably a liquid at room temperature and preferably has a high specific heat. The coolant is preferably water and may, in some applications, include additives to prevent corrosion or alter flow, heat exchanging, boiling point, or other attributes of the coolant.

Driven by a pump 518, which may be a simple immersion pump or may be separate from the reservoir 520, liquid coolant which is more at less at room temperature (that outside the heated enclosure) is made to flow from reservoir 520 into the cooling member through coolant inlet 515. The coolant circulates thru passages 512, draws excess heat from pellet hopper 220 and eventually enters coolant return line 516 to be returned to reservoir 520. The coolant returning through line 516 may be warmed by whatever heat has been extracted from the vicinity of hopper 222—corresponding to the heat from sources 302, 304, 306 mentioned earlier. In some alternative arrangements, the coolant Aside from active pumping By virtue of the circulating coolant, excessive heat that reaches cooling member 510 is readily conveyed to the cooler environment outside heated enclosure 110 and pellet hopper 220 is maintained at a steady low temperature comparable to the room temperature outside the enclosure. This alleviates problems of pellets prematurely adhering as is particularly applicable to pellet extruders operating within heated enclosures.

Cooling member 510 may be in the form of a removal jacket which surrounds an existing pellet hopper 510. Cooling member 510 may be either be flexible or may be a rigid metal assembly that attaches to, or clamps around, pellet hopper 222. Alternatively pellet hopper 210 and cooling member may be integrally formed. For example, a passageway may be formed in a solid block of metal to serve as the hopper 222 and other passages may be drilled, machined or otherwise formed to separately carry flowing coolant. In yet another arrangement, metal tubing for carrying coolant may be wrapped around pellet hopper 222 and with compatible metals, may be soldered, welded, glued or otherwise attached to promote efficient thermal coupling between the hopper and the coolant-carrying tubing. Many other arrangements are possible within the scope of the present teachings.

Figure 6A:
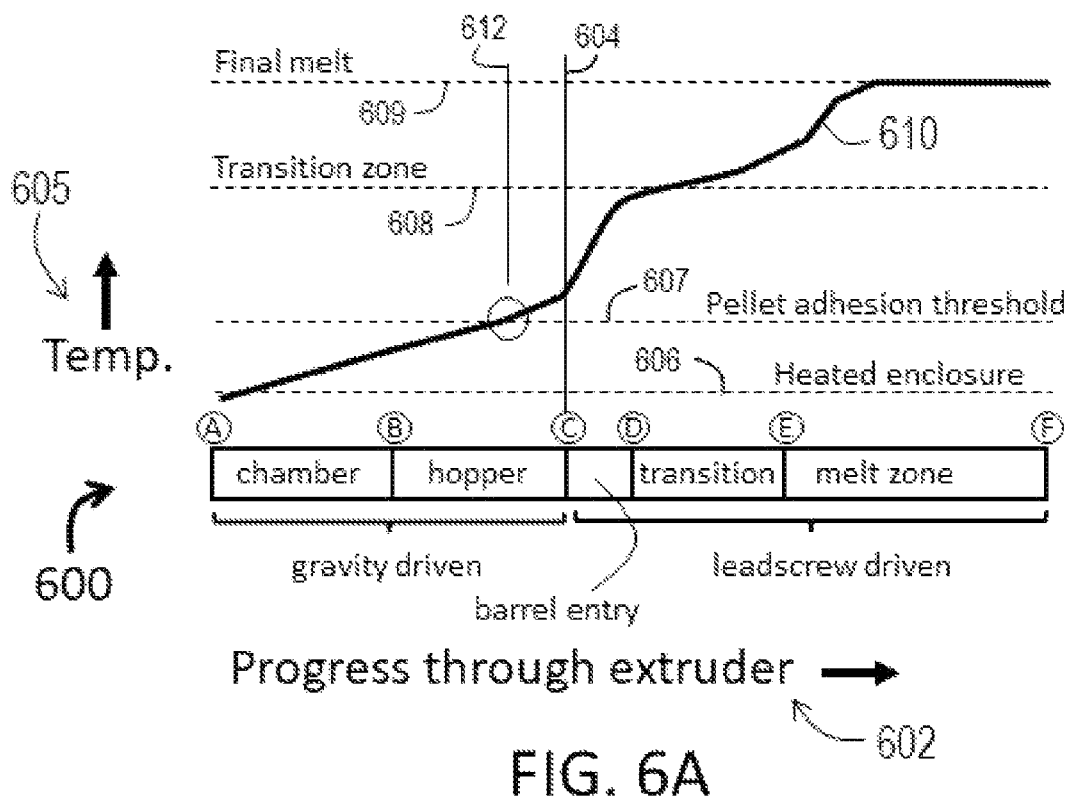
FIG. 6A is a plot of a problematic temperature profile as experienced by pellets as a function of progress through an extruder head.

FIG. 6A shows a first plot 600 of temperature experienced by a pellet versus progress of the pellet through extruder head 150 (from inlet 225 through nozzle 158) without the benefit of applying the present teachings. Plot 600 demonstrates the problematic temperature profile that has been experienced before the introduction and application of the present teachings.

In plot 600, the horizontal axis 602 represents the progress of a pellet through the extruder has demarcated by various stages, namely chamber then hopper then barrel entry, followed by the heated portions of the extruder barrel, namely the transition zone and the melt zone. The junctures between the zones correspond to the letter designations 'A' through 'F' as were presented in FIG. 2 of the drawings. More particularly, the letter designations shown in FIG. 2 point to specific parts of the extruder apparatus at which the corresponding temperatures represented in plot 600 might be observed. Further labels along the horizontal axis 602 are indications that the passage of a pellet through chamber 222 and hopper 220 (corresponding to points 'A' through 'C') is mainly gravity-driven and that the subsequent passage of the pellet through into extruder barrel 210 and downward through the heated sections (corresponding to points 'C' through 'F') is driven forcefully by the action of rotating lead screw 212. A point 604 along the horizontal axis 602 is specifically denoted as being the point of transition between gravity feeding and lead screw driven feeding, which happens to be at point 'C' as pellets drop from the hopper 220 into the path of flutes or threads on lead screw 212 rotating within barrel 210.

In plot 600, the vertical axis represents temperature and several specific temperature levels are superimposed and denoted as follows: A 'heated enclosure' temperature level 606 represents the temperature maintained within heated enclosure 110 which surrounds the components of extruder head 150. A 'pellet adhesion threshold' 607 represents an approximate temperature level above which pellets have a markedly increased tendency to adhere to one another. A 'transition zone' temperature level 608 represents the nominal temperature setting of the first heating stage 260 that heats extruder barrel 210. A 'final melt' temperature level 609 represents the temperature maintained by heating stages 270, 280 which is primarily the target temperature for plastic to be discharged from the nozzle at point 'F'.

Plot line 610 represents temperature experienced by a pellet as it progresses through the extruder, that is, from point a through point 'F'. This plot line will now be discussed in detail.

Plot line 610 shows that the temperature for a pellet entering chamber 222 at point 'A' and dwelling at a time near the top of chamber 222 is slightly less than the enclosure temperature level 606 due to the pellet-delivering air bursts arriving from colder air outside the enclosure and from the constant stream of agitation air entering through tube 226. Towards the bottom of chamber 222 (corresponding to point 'B') the temperature may be elevated above the heated enclosure temperature level 606 due to the propagation of heat through the walls of hopper 222 and from other sources as was explained in conjunction with FIG. 3.

Plot line 610 shows that, as a pellet drops into, hopper 220 at point 'B' and progresses to the bottom end of the hopper at point 'C', the temperature rises as the pellet moves closer and closer to the main source of high temperatures, particularly heating stage 260 on extruder barrel 210. Of particular note, during traversal from point 'B' to point 'C' in hopper 220, there is a juncture 612 at which the pellet reaches a temperature that exceeds the pellet adhesion threshold 607. This means that, in progressing past this point, pellets are at risk for adhering to one another and potentially forming jamming dusters as were depicted in FIG. 4. If pellets passing juncture 612 manage to reach the extruder barrel entry at point 'C' without incident, then successful pellet feeding and extrusion can proceed. At point 'C' and beyond, the pellets become forcefully driven towards the nozzle by direct contact with the moving hard surface of the lead screw threads. However, there is randomness in the occurrence of two or more pellets adhering to one another sufficiently to initiate a jam in the hopper or at the mouth of the extruder barrel. Importantly, with respect to plot 600, it may be said that greater distance in the horizontal progress axis by which juncture 512 precedes the point 604 at which pellets become forcefully driven, the greater the risk of pellets adhering to one another and creating a jam before reaching the lead screw. Undesirable escalation of temperatures above the pellet adhesion threshold worsens if the threshold is reached even earlier in the progress, such as at the mouth of the hopper corresponding to point B or within chamber 222.

Therefore, to assure that pellets reliably reach the lead screw, it is important to minimize the extent to which juncture 612 precedes progress point 'C' of, better yet, to ensure that juncture 612 occurs after progress point 'C'. Once the pellets pass point 'C', they cannot jam because they are thereafter forcefully driven down barrel 210 by, contact with rotating lead screw 212 and softened by heating.

Other characteristics of plot line 610 show that, as a pellet enters the extruder barrel 210 at point 'C' and is forcefully driven downward, the pellet is raised to transition zone temperature 608 and then final melt temperature 609. During these stages of progress, a given pellet melds into a continuous mass with other pellets and the resulting melt is forcefully discharged through the extruder nozzle as represented by point 'F'.

In summary, plat 600 demonstrates the high incidence of pellet misfeeds experienced by a pellet-type extruder due to the phenomenon that a pellet (or mass of pellets) may reach a temperature above the pellet adhesion threshold before it has entered the extruder barrel.

Figure 6B:
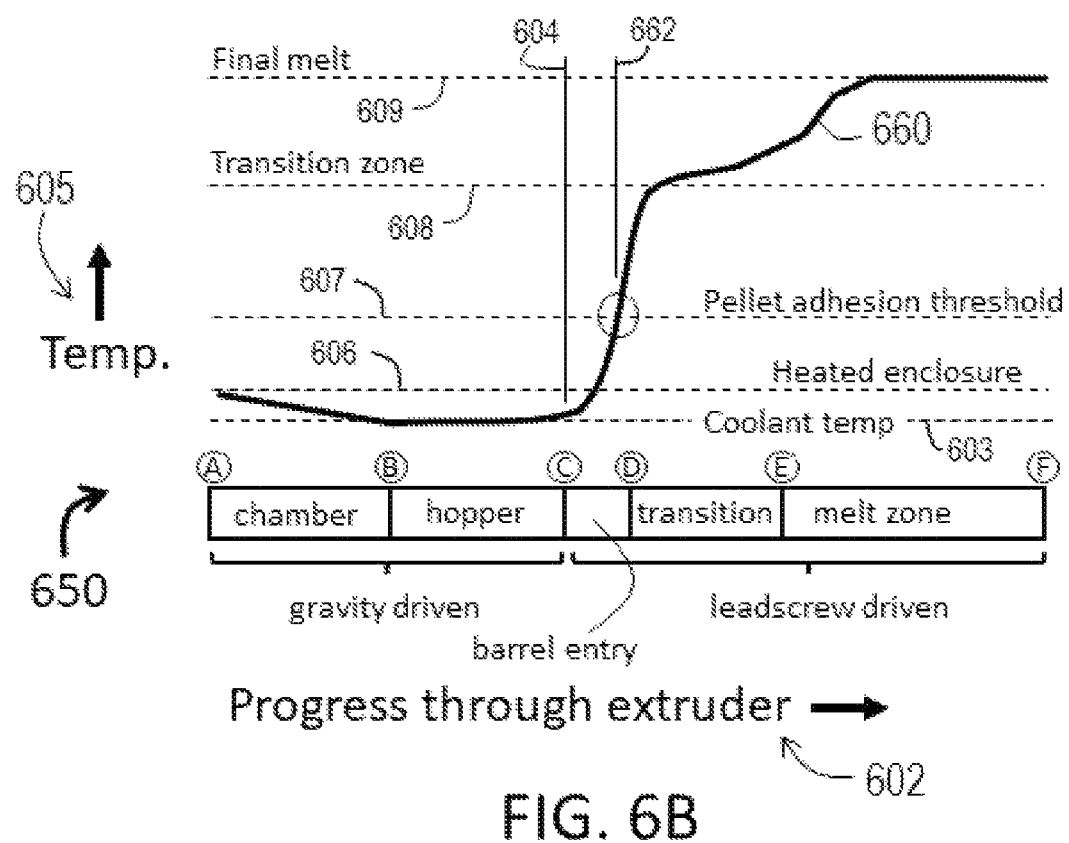
FIG. 6*b* is a plot of temperature experienced by pellets as a function of progress through an extruder head in accordance with a preferred embodiment of the present invention.

In contrast, FIG. 6B presents a plot 650 pertaining to a pellet-type extruder (such as extruder head 500) to which the present teachings have been applied. In plot 650, the vertical and horizontal axes, including the labels and progress points, are the same as for plot 600 above.

Plot line 660 demonstrates a temperature profile—markedly different from plot line 610—for a pellet (or mass of pellets) traversing the extruder head from inlet 225 to nozzle 158.

At progress point 'A', plot line 660 reflects that a pellet entering or dwelling briefly near the top of chamber 222 may experience a temperature somewhat below the heated enclosure temperature level 606. This is initially similar to what was shown by plot line 610.

However, as a pellet falls lower into chamber 222 and enters the upper end of hopper 220 (point 'B'), plot line 650 indicates that the temperature actually drops, unlike the rise observed with plot line 610. This is due to the cooling of hopper 220 (and, by conduction, some cooling of adjacent components) by cooling member 510 in accordance with the present teachings. Because the circulating coolant is thermally heat sinking to the environment outside of the heat enclosure, such as the room air outside of system 100 the temperature of hopper will tend to be nearly the coolant temperature level 603 which may be room temperature (25 degrees Celsius) or some other temperature such as 10 degrees Celsius if the liquid coolant is—or is, thermally coupled to—a chilled water source as is often available in industrial settings. However, excessively cold coolant may create too much of thermal drain on the subsequent heating stages 260, 210, 280, so room temperature coolant is recommended and has proven entirely adequate in practice.

Application of coding member 510 as depicted in FIG. 5 desirably achieves some degree of cooling that extends into the bottom of chamber 222.

As plot line 660 shows, temperatures remain essentially constant through hopper 220, from points 'B' to point 'C' due to the action of cooling member 510, though there may be a slight use towards the lower end nearest active heating stages. In any event the temperature within hopper 220 is maintained far below pellet adhesion threshold 607. As progress is made from point 'C' to point 'D', corresponding to where pellet hopper 220 connects with extruder barrel 210 a short distance above first heating stage 260, the temperature rises more abruptly than in plot 600, as the thermal drain of cooling member 510 and the thermal source of heating stage 260 are in relatively close proximity. This abrupt temperature increase is inconsequential because, once the pellets have proceeded beyond point 'C' (also denoted by progress juncture line 604) pellet adhesion no longer jeopardizes reliable pellet feeding. As shown by plot line 660, a juncture 662 at which temperatures experienced by pellets exceed pellet adhesion threshold 607 occurs after point 'C' where pellets become subject to forceful propulsion down the extruder barrel. As mentioned before, reliable pellet feeding is promoted by causing juncture 662 to occur alter point 'C'.

In accordance with the present teachings, the application of cooling member 510 delays the point at which pellet adhesion threshold 607 is exceeded until at least prowess point 'C' at which the pellets have already entered the extruder barrel and are no longer solely gravity-fed or air driven. Without the benefit of the present teachings, the pellets passing through a pellet-type extruder head tend to exceed the pellet adhesion threshold before entering the extruder barrel, leading to unreliable feeding and ruined print runs. This problem is exacerbated when such an extruder head is used within a heated enclosure, in which case the air immediately surrounding the apparatus becomes far less effective as a means to dissipate excessive heat from a holding chamber or feed hopper.

While the present teachings have been set forth using one example design for an extruder head, it must be understood that the pellet feeding problem described above can be experienced by a wide variety of extruder designs and can be likewise alleviated by applying some form of the present teachings. For example, while may be possible in an alternative extruder head design to add a mechanical ram or auger within feed hopper 220, there may be a point, prior to entering the reach of these forceful mechanisms, at which temperatures may exceed a pellet adhesion threshold. The tendency for pellets to adhere can be mitigated by adding a cooling member at or before the point at which these forceful mechanisms take over.

In the preceding description, various exemplary embodiments have been described with reference to the accompanying drawings. It will be evident, however, that various modifications and changes may be made thereto, and additional embodiments may be implemented, without departing from the scope of the invention as set forth in the claims that follow. The description and drawings are accordingly to be regarded in an illustrative rather than a restrictive sense.

What is claimed is:

1. A fused deposition modeling system for forming a solid object from a raw material provided in pellet form comprising:
   a build surface serving as a substrate upon which to form the solid object by depositing the raw material;
   a pellet extruder, comprising a pellet inlet and a discharge nozzle, which receives pellets of raw material via the pellet inlet, applies heat to melt the pellets and discharges a molten form of the raw material from the discharge nozzle;
   a motor-driven motion mechanism for generating relative motion between the extruder and the build surface;
   wherein the pellet-type extruder comprises a motor-driven lead screw for propelling the molten raw material towards the nozzle and at least one pathway by which pellets travel towards the lead screw and wherein, for at least a portion along the pathway, the pellets are propelled under the influence of gravity; and
   a cooling member, thermally coupled to the portion of the pathway along which the pellets are propelled principally under the influence of gravity, for receiving a fluid coolant from a source remote from the pellet extruder and reducing the temperature of sad portion of the pathway to below a pellet adhesion threshold temperature;

wherein the pellet-type extruder operates within a heated enclosure and wherein the cooling member comprises passages through which a coolant fluid flows and wherein the coolant fluid flows into the cooling member from a source outside the heated enclosure and the coolant fluid enters the cooling member at a temperature below a pellet adhesion threshold temperature for the raw material.

2. The system of claim 1 wherein the cooling member maintains a temperature along said portion of the pathway that is below a pellet adhesion threshold for the raw material.

3. The system of claim 1 further comprising an enclosure that surrounds said build surface, pellet extruder, motion mechanism and cooling member and that is healed within to maintain a higher temperature within the enclosure than a temperature outside the enclosure.

4. The system of claim 3 wherein the fluid coolant recirculates between the cooling member and a heat exchanger configured to transfer heat outside of the enclosure.

5. The system of claim 3 wherein the fluid coolant recirculates between the cooling member and a fluid coolant reservoir outside of the enclosure.

6. The system of claim 1 wherein the remote source from which the inlet port receives pellets is outside of the heated enclosure and pellets are conveyed to the inlet port at least partially driven by a flow of gas before reaching the at least one portion of the pathway at which the pellets move toward the extruder barrel principally under the influence of gravity.

7. The system of claim 1 wherein the reduction in temperature pertains to that portion of the pathway between where the pellets are driven by a flow of gas and where the pellets enter the cylindrical barrel.

\* \* \* \* \*